United States Patent [19]

Dengler et al.

[11] 4,373,171

[45] Feb. 8, 1983

[54] METHOD FOR DECREASING THE STOP DISTANCE IN MOVING TAPE DEVICES

[75] Inventors: Robert Dengler, Tuerkenfeld; Franz J. Meyer, Emmering, both of Fed. Rep. of Germany

[73] Assignee: Siemens Aktiengesellschaft, Berlin & Munich, Fed. Rep. of Germany

[21] Appl. No.: 177,968

[22] Filed: Aug. 14, 1980

Related U.S. Application Data

[62] Division of Ser. No. 72,979, Sep. 6, 1979.

[30] Foreign Application Priority Data

Sep. 21, 1978 [DE] Fed. Rep. of Germany ....... 2841106

[51] Int. Cl.³ .................... G11B 15/18; G11B 15/48
[52] U.S. Cl. .................................... 360/71; 360/73; 360/74.1
[58] Field of Search ............... 360/73, 71, 74.1, 74.4, 360/50, 52–53

[56] References Cited

U.S. PATENT DOCUMENTS

| | | | |
|---|---|---|---|
| 3,325,796 | 6/1967 | Otto et al. | 360/50 |
| 3,440,630 | 4/1969 | Niquette | 360/50 X |
| 3,772,664 | 11/1973 | Schlickeisen | 360/52 |
| 4,093,831 | 6/1978 | Sharp et al. | 360/74.1 X |

FOREIGN PATENT DOCUMENTS

| | | | |
|---|---|---|---|
| 2529151 | 1/1977 | Fed. Rep. of Germany | 360/50 |
| 2855790 | 12/1979 | Fed. Rep. of Germany | 360/74.1 |

*Primary Examiner*—John H. Wolff
*Attorney, Agent, or Firm*—Hill, Van Santen, Steadman, Chiara & Simpson

[57] ABSTRACT

In a magnetic tape device in which a motor or a drive capstan is connected with a tachometer which supplies a pulse sequence proportional to the velocity of the motor and in which the most recently written information is immediately subjected to a read-after-write check by the use of a separate read head, a method for weakly retarding the tape movement during the entire read-after-write check and for strongly retarding take movement immediately thereafter is provided. A permanent storage stores rated velocity values of the magnetic tape at fixed points of the stop distance for the entire stop path, and a counter and a shift register provide digital output signals which represent the deviation of the actual velocity of the tape from its rated velocity at the fixed distance points and is connected to the motor through a digital-analog converter for continuous readjustment of the speed thereof.

6 Claims, 7 Drawing Figures

METHOD FOR DECREASING THE STOP DISTANCE IN MOVING TAPE DEVICES

This is a division, of application Ser. No. 072,979, filed Sept. 6, 1979.

BACKGROUND OF THE INVENTION

1. Field of the Invention

The present invention relates to devices for recording information on and reading information from a moving magnetic tape, and in particular relates to a method for shortening the stop distance of the tape with the added advantage of reducing the system load in the tape device.

2. Description of the Prior Art

In digital magnetic devices having high recording density, as well as in magnetic tape devices operating according to the GCR method, the nominal inter-block space is approximately 7.62 mm. The inter-block space is defined by the sum of a stop distance and a start distance, i.e., the sum of the distances which the tape travels due to the inertia of the system after a stop order is received, and the distance the tape moves before it comes up to speed after a start order is received.

High tape velocities are required in order to rapidly read and write information stored on magnetic tape, and the corresponding high acceleration values associated with such high velocities result in tape vibrations upon starting the device, i.e., starting the motor which moves the tape. Such vibrations can be lessened by selecting low values for the starting tape acceleration, however, this approach results in a lengthening of the starting distance and in a lengthening of the inter-block space, so that less information can be stored on a given length of magnetic tape.

One approach to the problem of shortening the entire stop distance while retaining the nominal value of the inter-block space has been to design the read signal evaluation electronics in such a manner that a read-out of the recorded information can take place with a tape velocity decrease of only 30% of the nominal velocity. This method, however, has the disadvantage that deviations in the tape velocity caused by tape vibrations can give rise to erroneous readings and subsequent evaluations errors because the read-out is still occurring in an area of strong tape retardation.

SUMMARY OF THE INVENTION

It is an object of the present invention to provide a method and circuit arrangement for shortening the stop distance of the tape in magnetic devices which thereby substantially minimizes deviations in the tape velocity during a read-after-write check even though retardation of the magnetic velocity is already beginning during the read-after-write check. As a further added advantage, shortening the stop distance in this manner also lessens the system load on the drive motor.

The object is inventively achieved by undertaking a tape retardation operation in two phases, i.e., a weak retardation phase which is undertaken during the entire read-after-write check, followed by a strong retardation phase immediately after termination of the read-after-write check and continued until the tape stops. The strong retardation phase can be chosen so as to maintain a nominal inter-block distance, yet read errors due to tape vibration are minimized by the use of a weak retardation phase.

The above-described method of tape retardation also reduces the load of the entire drive system, and correspondingly reduces power consumption, because the magnetic tape is not decelerated with the maximum possible retardation at the beginning of the retardation phase, thereby lessening the instantaneous power output required of the drive system.

DESCRIPTION OF THE PREFERRED EMBODIMENTS

Figure 1A:
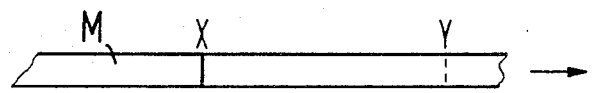
FIGS. 1a, 1b, 1c, 1d and 1e graphically represent tape velocities during a tape retardation operation, with FIG. 1b graphically defining a "stop distance", FIGS. 1c and 1d representing prior art approaches, and FIG. 1e representing a two phase tape retardation in accordance with the principles of the present invention.
Figure 1B:
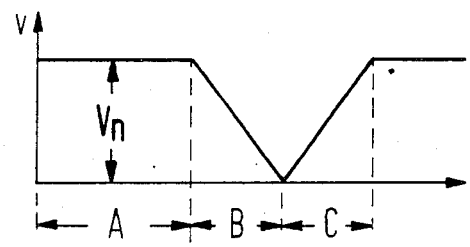

As shown in FIGS. 1a and 1b, a magnetic tape M has an inter-block space which is defined by the sum of the distances A, B and C where distance A represents the interval between the write head and the read head of the device, distance B represents the so-called stop profile distance, and distance C represents the start distance. The tape M operates at a nominal velocity $V_n$ and has a so-called stop distance between the points X and Y which is the sum of distances A and B.

Figure 1C:
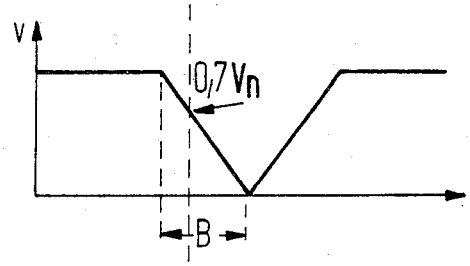

One approach to shortening the entire stop distance while retaining the nominal inter-block space is shown in FIG. 1c. In that approach, read signal evaluation electronics are designed so that a read-out of the recorded information on the tape M is undertaken at a point at which the tape M is travelling at approximately 0.7 $V_n$, i.e., a 30% decrease in nominal velocity. As can be seen from FIG. 1c, the stop profile distance B has already begun while the read head is still checking the information just recorded. While nominal inter-block space is thereby maintained, however, the method represented by FIG. 1c has the disadvantage that a read-out is being undertaken during a period of rapid tape retardation, and the resulting tape vibrations can give rise to erroneous read-out signals and lead to evaluation errors.

Figure 1D:
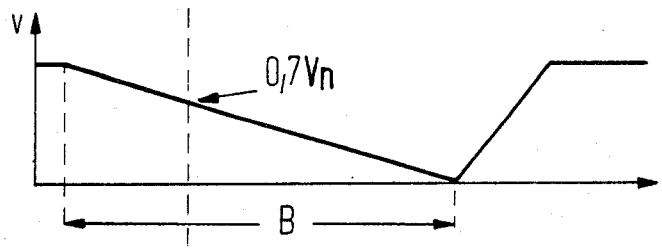

Another approach to the problem is shown in FIG. 1d which minimizes tape vibrations upon transition from a continuous tape run to the tape retardation phase by the use of a lower retardation of the magnetic tape throughout the entire retardation phase. As shown in FIG. 1d, however, this results in a substantial lengthening of the stop profile distance B, and therefore a lengthening of the inter-block space and a decrease of the total amount of information which can be stored on a given length of tape M. It is assumed in FIG. 1d that a read-out is also occurring at a point represented by 0.7 $V_n$.

Figure 1E:
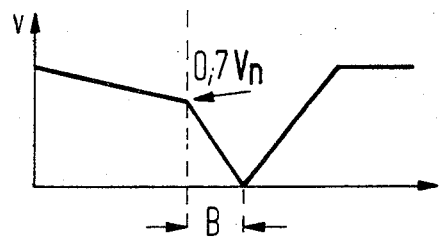

An approach according to the principles of the present invention is graphically illustrated in FIG. 1e, in which the tape retardation is undertaken in two phases, a weak retardation phase represented by the low slope which is undertaken during the entire time of the read-after-write check to minimize read-out errors due to tape vibration, immediately followed by a rapid or steep deceleration phase during the stop profile distance represented by B. The transition occurs at a point approximately $0.7 V_n$.

Figure 2:
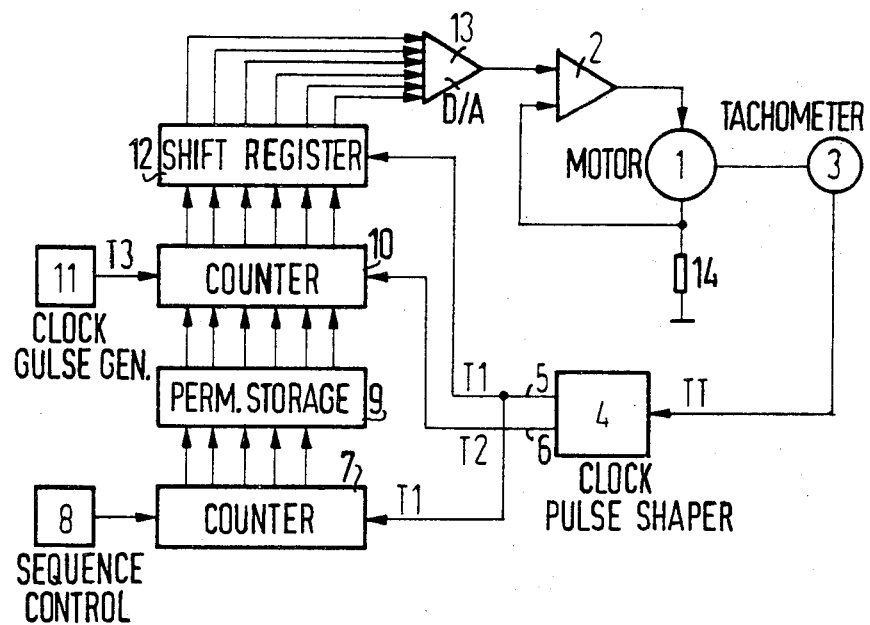
FIG. 2 is a schematic block diagram of a circuit for achieving the two phase tape retardation represented in FIG. 1e in accordance with the principles of the present invention.

A circuit for achieving the two phase tape retardation represented by FIG. 1e is shown in FIG. 2. The circuit consists of a motor 1 operating in conjunction with a controlled-gain amplifier 2 in a known manner, and which is also mechanically connected with a tachometer 3. The tachometer 3 is preferably connected to the drive shaft of the motor 1.

Figure 3:
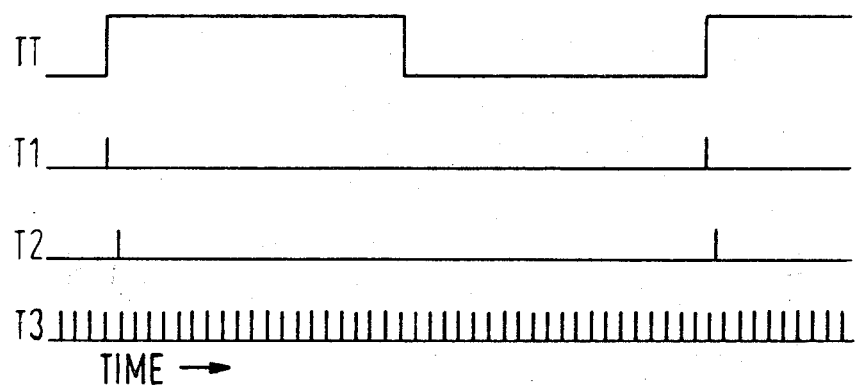
FIG. 3 is a graphic representation of digital pulses appearing at various points in the circuit of FIG. 2.

A clock pulse shaper 4 is connected to the tachometer out-put and receives tachometer clock pulses TT, as shown in FIG. 3, in a known manner and generates a first clock pulse sequence T1 on line 5 and a second clock pulse sequence T2 on line 6, both of which are also represented in FIG. 3. As shown in FIG. 3, the clock pulse sequences T1 and T2 are phase-shifted by a small amount.

The pulse sequence T1 is transmitted to a counter 7 and is admitted thereto at a point in time which is fixed by a sequence control 8 in a known manner so that the counter 7 counts the pulses in the sequence T1 supplied by the clock pulse shaper 4. Because the tachometer 3 is rigidly connected with the motor 1 and the motor 1 is in turn rigidly connected in a known manner with a drive capstan 14 for moving the magnetic tape, the counter reading of the counter 7 represents the path covered by the moving tape at the point in time at which the clock pulses T1 occur.

A permanent storage 9 which may, for example, be a PROM, is connected with the outputs of the counter 7 and has stored therein rated velocity values for the magnetic tape for the entire stop distance at specific, fixed points of the stop distance. These fixed, stored points correspond to the counter readings from the counter 7. When the permanent storage 9 is directly addressed by the counter 7, the output of the storage 9 will represent the rated velocity values of the tape at each respective input point in time to the permanent storage 9.

The outputs of the permanent storage 9 are respectively connected to a second counter 10, which is set to the rated velocity of the tape upon occurrence of one of the clock pulses T2, which, as described above, are slightly phase-shifted with respect to the clock pulses T1. The counter 10 is then counted back by means of clock pulses T3, shown in FIG. 3, supplied by a clock pulse generator 11 until a pulse of the clock pulse sequence T1 again occurs. As shown in FIG. 3, the repetition rate of the clock pulses T3 must necessarily be significantly higher than the repetition rate of the clock pulses T1 or T2. Because the repetition rate of the clock pulses T3 is fixed while the clock pulses T1 and T2 are derived from the tachometer clock pulses TT, and are thus dependent on tape velocity, the counter reading of the counter 10 ensuing upon the occurrence of a clock pulse T1 represents the difference between the actual velocity of the tape and the value of its rated velocity stored in the permanent storage 9.

The output of the counter 10 is then transferred to a register 12 and is retained therein until the occurrence of the next clock pulse T1 from the clock pulse shaper 4. The outputs of the register 12 are connected in a known manner to a digital-analog converter 13 which controls the controlled-gain amplifier 2 which in turn controls the motor 1 in a known manner.

The phase shift between the clock pulses T1 and T2 thus determines a period during which slow deceleration of the tape occurs, followed by rapid deceleration as shown in FIG. 1e for the remainder of a sequence.

Although modifications may be suggested by those skilled in the art it is the intention of the inventors to embody within the patent warranted hereon all changes and modifications as reasonably and properly come within the scope of their contribution to the art.

We claim as our invention:

1. A method for shortening the stop distance of a magnetic recording tape normally moving at a nominal velocity in a tape recording and reading device in which an amplifier-controlled motor is drivingly connected to a capstan for moving said tape, and in which a tachometer is connected to said motor and provides a digital pulse sequence which is proportional to the velocity of said motor, and in which newly written information is subjected to a read-after-write check, said method comprising the steps of
weakly retarding movement of said tape by slowly decelerating said motor during the duration of said read-after-write check until the velocity of said tape is 0.7 times said nominal velocity;
rapidly retarding movement of said tape immediately after said read-after-write check by rapidly decelerating said motor; and
continuing said rapid deceleration until said tape is stopped.

2. The method of claim 1 wherein the steps of weakly retarding said tape movement and rapidly retarding said tape movement are further defined by the steps:
counting the number of pulses in the tachometer pulse sequence to determine the attainment by the tape of specific points within said stop distance;
storing a plurality of rated velocity values of the tape at fixed points of the stop distance for the entire stop path;
determining the deviation of the actual velocity of the tape from the stored rated velocity at said fixed distance points;
generating a signal representing said deviation; and
supplying said signal representing said deviation to said amplifier controlled motor for readjustment of the velocity of said motor.

3. The method of claim 2 including the additional steps of:
deriving a first clock pulse from said tachometer pulse sequence, and
utilizing said first clock pulse to count up said counter whereby the counter reading of said counter represents the distance covered by the tape during deceleration.

4. The method of claim 3 including the additional steps of:
deriving a second clock pulse from said tachometer pulse sequence which is phase shifted with respect to said first clock pulse;
generating a third clock pulse of a fixed repetition rate which has a high frequency with respect to said first and second clock pulses; and
utilizing said second and third clock pulses to count down a second counter which receives said rated velocity values from said permanent storage until the occurrence of a pulse from said first clock pulse sequence.

5. The method of claim 4 wherein including the additional step of transmitting the contents of said second counter to a register upon the occurrence of a pulse from said first clock pulse sequence.

6. The method of claim 5 including the additional step of converting the output of said register into an analog signal for input to said amplifier-controlled motor to control the velocity thereof.

* * * * *